(12) United States Patent
Wen et al.

(10) Patent No.: US 11,603,960 B1
(45) Date of Patent: Mar. 14, 2023

(54) COMPUTING DEVICE SUPPORTING STRUCTURE

(71) Applicants: Alison Wen, Plano, TX (US); Shaofen Chen, Plano, TX (US); Zhaofang Wen, Plano, TX (US)

(72) Inventors: Alison Wen, Plano, TX (US); Shaofen Chen, Plano, TX (US); Zhaofang Wen, Plano, TX (US)

( * ) Notice: Subject to any disclaimer, the term of this patent is extended or adjusted under 35 U.S.C. 154(b) by 0 days.

(21) Appl. No.: 17/129,807

(22) Filed: Dec. 21, 2020

Related U.S. Application Data

(63) Continuation of application No. 15/803,754, filed on Nov. 4, 2017, now abandoned.

(51) Int. Cl.
| | |
|---|---|
| *F16M 11/24* | (2006.01) |
| *F16M 11/38* | (2006.01) |
| *F16M 11/26* | (2006.01) |
| *G06F 1/16* | (2006.01) |

(52) U.S. Cl.
CPC ............ *F16M 11/24* (2013.01); *F16M 11/26* (2013.01); *F16M 11/38* (2013.01); *G06F 1/1613* (2013.01)

(58) Field of Classification Search
CPC ........ F16M 11/38; F16M 11/26; F16M 11/24; G06F 1/166; G06F 1/1613
See application file for complete search history.

(56) References Cited

U.S. PATENT DOCUMENTS

| | | | | | |
|---|---|---|---|---|---|
| 2,954,630 | A | * | 10/1960 | Hull | A47G 1/143 40/761 |
| 3,190,669 | A | * | 6/1965 | Walzak | B62B 17/00 248/688 |
| 3,262,665 | A | * | 7/1966 | Black | A47F 7/0078 248/176.1 |
| 3,546,802 | A | * | 12/1970 | Preston | A47G 1/142 40/762 |
| 4,432,152 | A | * | 2/1984 | Daenen | A47G 1/065 40/781 |
| 4,940,204 | A | * | 7/1990 | Nelson | F16M 11/10 248/688 |
| 6,138,967 | A | * | 10/2000 | Okamoto | E04H 9/0235 267/140.13 |
| 6,282,827 | B1 | * | 9/2001 | Holmes | A47G 1/142 40/748 |
| 6,283,437 | B1 | * | 9/2001 | Kang | F16F 15/02 181/207 |

(Continued)

*Primary Examiner* — Eret C McNichols
(74) *Attorney, Agent, or Firm* — Jeffrey Roddy

(57) ABSTRACT

A support prong system for a laptop device or other device includes one or more support prongs that are attachable to an underside of the device. Each support prong has a proximal prong portion for attachment nearest the device, and a most distal portion for contact with a device supporting surface. The support prongs may include one or more intermediate prong portions between the proximal prong portion and most distal portion. The system includes an attachable mount typically attached to the underside of the device and residing between the proximal prong portion and the device. The attachable mount has an active coupler member that couples and decouples with the proximal prong portion. Height and angle adjustment for the laptop or other device may be obtained by adjusting the one or more support prongs.

2 Claims, 18 Drawing Sheets

(56) References Cited

U.S. PATENT DOCUMENTS

| | | | | |
|---|---|---|---|---|
| 6,349,657 B1* | 2/2002 | Wohlford | A47B 81/065 | 108/94 |
| 6,474,614 B2* | 11/2002 | MacEachern | F16M 11/10 | 248/349.1 |
| 6,615,525 B1* | 9/2003 | Chang | A47G 1/142 | 40/745 |
| 6,682,040 B1* | 1/2004 | MacEachern | G06F 1/203 | 248/349.1 |
| 7,159,771 B2* | 1/2007 | Singgih | F16M 11/10 | 235/383 |
| 7,320,195 B1* | 1/2008 | Kushner | A47G 1/142 | 40/781 |
| 7,415,108 B2* | 8/2008 | Toh | H04M 1/11 | 379/454 |
| 7,542,276 B2* | 6/2009 | Chang | G06F 1/1616 | 312/223.2 |
| 7,566,043 B2* | 7/2009 | Chen | G06F 1/1616 | 248/677 |
| 7,715,190 B2* | 5/2010 | Tang | G06F 1/1616 | 361/679.55 |
| 7,810,768 B2* | 10/2010 | Wang | F16M 11/16 | 248/176.3 |
| 7,821,786 B2* | 10/2010 | Hadad | G06F 1/166 | 361/679.09 |
| 7,836,623 B2* | 11/2010 | Wang | H04N 1/00562 | 248/458 |
| 7,850,132 B2* | 12/2010 | Chen | F16M 11/16 | 248/676 |
| 7,866,615 B2* | 1/2011 | Hsuan | F16M 13/00 | 248/920 |
| 8,139,357 B2* | 3/2012 | Trang | G06F 1/203 | 400/681 |
| 8,243,427 B2* | 8/2012 | Fu | F16M 13/00 | 361/679.55 |
| 8,255,015 B2* | 8/2012 | Wang | G06F 1/1626 | 455/575.1 |
| 8,491,067 B2* | 7/2013 | Chen | H05K 5/0234 | 248/677 |
| 8,537,546 B2* | 9/2013 | Shih | H05K 5/0234 | 455/575.1 |
| 8,599,570 B2* | 12/2013 | Ke | F16M 13/005 | 361/755 |
| 8,616,508 B1* | 12/2013 | Coleman | F16M 11/2021 | 248/176.1 |
| 8,692,813 B2* | 4/2014 | Yeh | G06F 3/03545 | 345/179 |
| 8,724,319 B2* | 5/2014 | Shih | F16M 13/00 | 361/679.05 |
| 8,763,501 B2* | 7/2014 | Cheng | B25B 23/00 | 248/688 |
| 8,936,229 B2* | 1/2015 | Zhu | H04M 1/04 | 248/688 |
| 8,941,980 B2* | 1/2015 | Hsu | G06F 1/1616 | 361/679.44 |
| 8,954,124 B2* | 2/2015 | Webber | B65D 43/12 | 455/575.8 |
| 9,229,477 B2* | 1/2016 | Morrison | G06F 1/1632 | |
| 9,471,108 B2* | 10/2016 | Dong | G06F 1/166 | |
| 9,477,267 B2* | 10/2016 | You | F16M 11/14 | |
| 9,491,875 B2* | 11/2016 | Deng | H05K 5/0234 | |
| 9,933,009 B1* | 4/2018 | Zaloom | F16M 11/10 | |
| 10,135,480 B1* | 11/2018 | Zaloom | H04B 1/3877 | |
| 10,244,098 B2* | 3/2019 | Muthukumar | H04M 1/0202 | |
| 10,288,215 B2* | 5/2019 | Fang | F16M 13/005 | |
| 10,303,222 B2* | 5/2019 | Wang | G06F 1/16 | |
| 10,371,196 B1* | 8/2019 | Zaloom | F16M 11/38 | |
| 10,420,230 B2* | 9/2019 | Uchiyama | H05K 5/0204 | |
| 10,588,435 B2* | 3/2020 | Bergeron | A47B 97/04 | |
| 2003/0196365 A1* | 10/2003 | Bracker | A47G 1/0616 | 40/738 |
| 2006/0044288 A1* | 3/2006 | Nakamura | G06F 3/03545 | 345/179 |
| 2007/0062089 A1* | 3/2007 | Homer | G06F 1/1626 | 40/754 |
| 2007/0266606 A1* | 11/2007 | Morgan | A47G 1/06 | 40/700 |
| 2008/0062624 A1* | 3/2008 | Regen | G06F 1/166 | 361/679.56 |
| 2008/0297438 A1* | 12/2008 | Lin | A47G 1/142 | 345/30 |
| 2009/0268398 A1* | 10/2009 | Tang | G06F 3/0208 | 361/679.55 |
| 2010/0007251 A1* | 1/2010 | Hsu | F16M 11/10 | 248/351 |
| 2010/0008039 A1* | 1/2010 | Shen | G06F 1/166 | 361/679.55 |
| 2010/0302213 A1* | 12/2010 | Yeh | G06F 3/03545 | 345/179 |
| 2011/0031853 A1* | 2/2011 | Yang | G06F 1/166 | 248/157 |
| 2011/0102752 A1* | 5/2011 | Chen | F16M 13/00 | 361/679.01 |
| 2011/0164358 A1* | 7/2011 | Duan | H05K 5/0234 | 361/679.01 |
| 2012/0026684 A1* | 2/2012 | Matthews | F16M 13/00 | 211/26 |
| 2012/0275094 A1* | 11/2012 | Zhou | F16M 11/10 | 361/679.01 |
| 2012/0327628 A1* | 12/2012 | Shih | F16M 13/02 | 248/222.12 |
| 2013/0032686 A1* | 2/2013 | Yuan | H04M 1/0283 | 248/351 |
| 2013/0107427 A1* | 5/2013 | Cheng | G06F 1/166 | 361/679.01 |
| 2013/0120933 A1* | 5/2013 | Ting | G06F 1/1616 | 361/679.55 |
| 2013/0342976 A1* | 12/2013 | Chung | G06F 1/166 | 248/688 |
| 2014/0016249 A1* | 1/2014 | Ku | H05K 13/00 | 361/679.01 |
| 2014/0131540 A1* | 5/2014 | Shi | H05K 5/0234 | 248/346.03 |
| 2014/0140000 A1* | 5/2014 | Ooe | G06F 1/1658 | 361/679.56 |
| 2015/0132528 A1* | 5/2015 | Pirayesh | B32B 3/08 | 347/110 |
| 2015/0146373 A1* | 5/2015 | Deng | G06F 1/166 | 248/688 |
| 2017/0311722 A1* | 11/2017 | Bergeron | F16M 13/00 | |
| 2018/0077809 A1* | 3/2018 | Uchiyama | G06F 1/166 | |
| 2018/0275723 A1* | 9/2018 | Wang | G06F 1/16 | |
| 2019/0110597 A1* | 4/2019 | Jones | G01C 9/02 | |

* cited by examiner

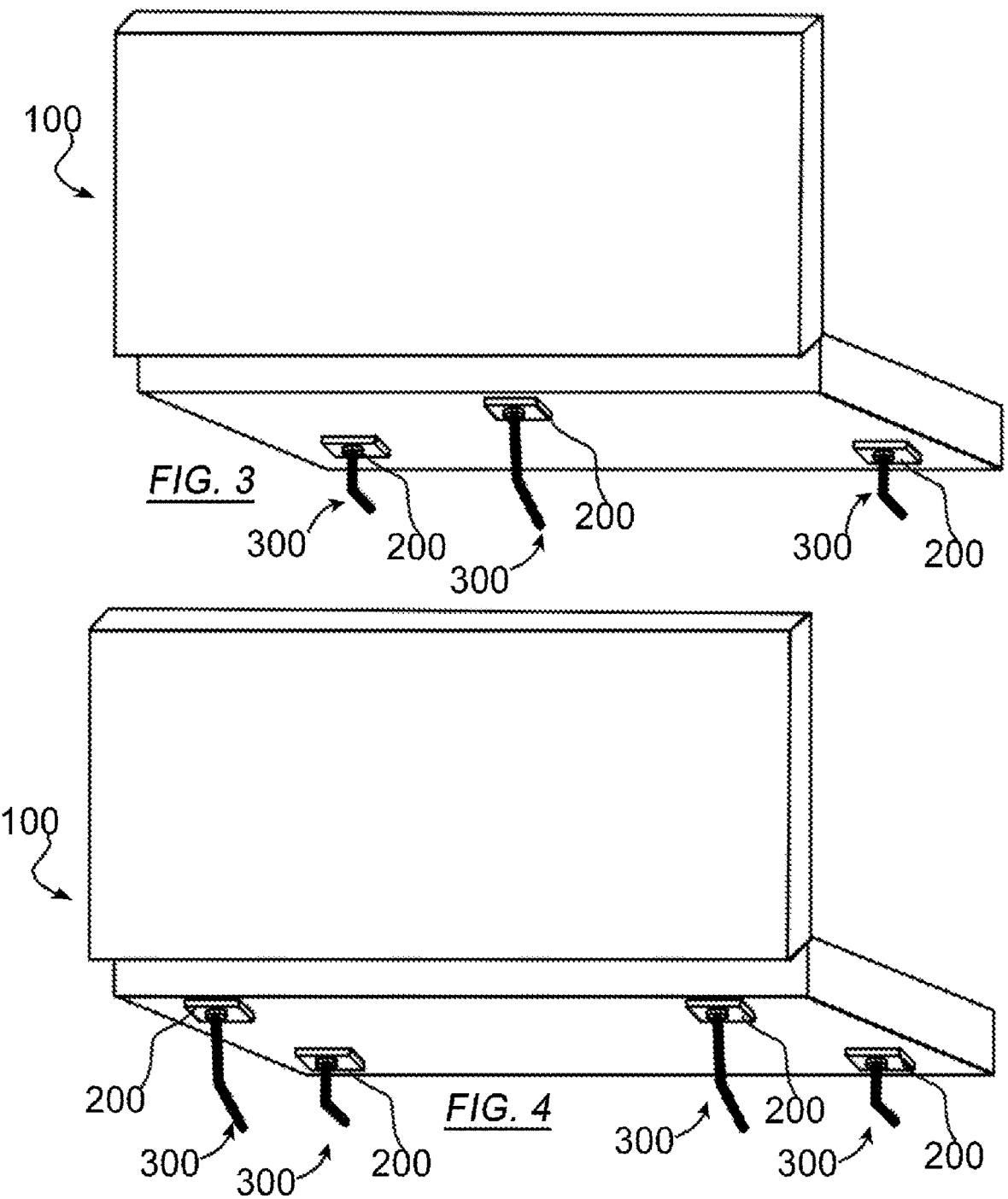

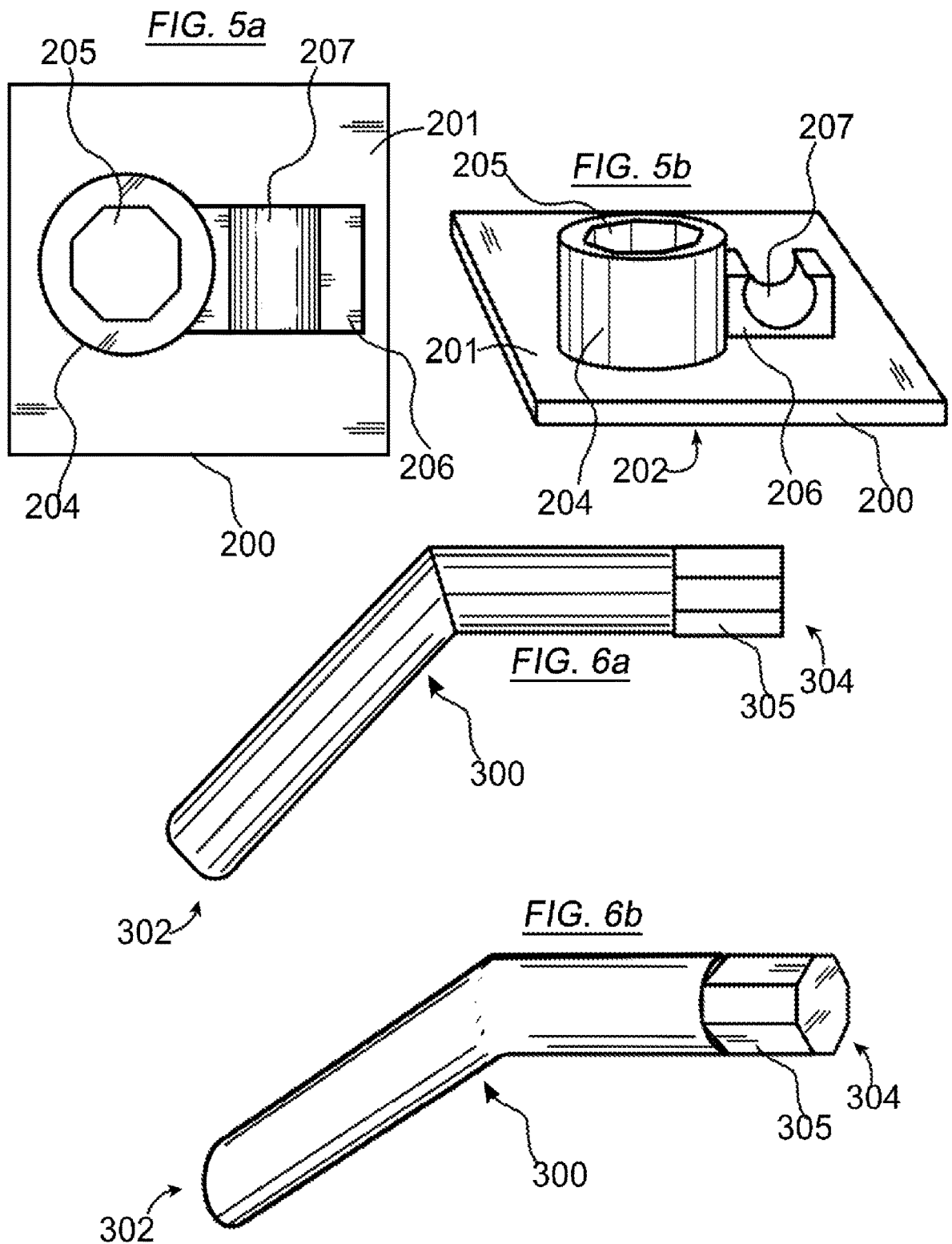

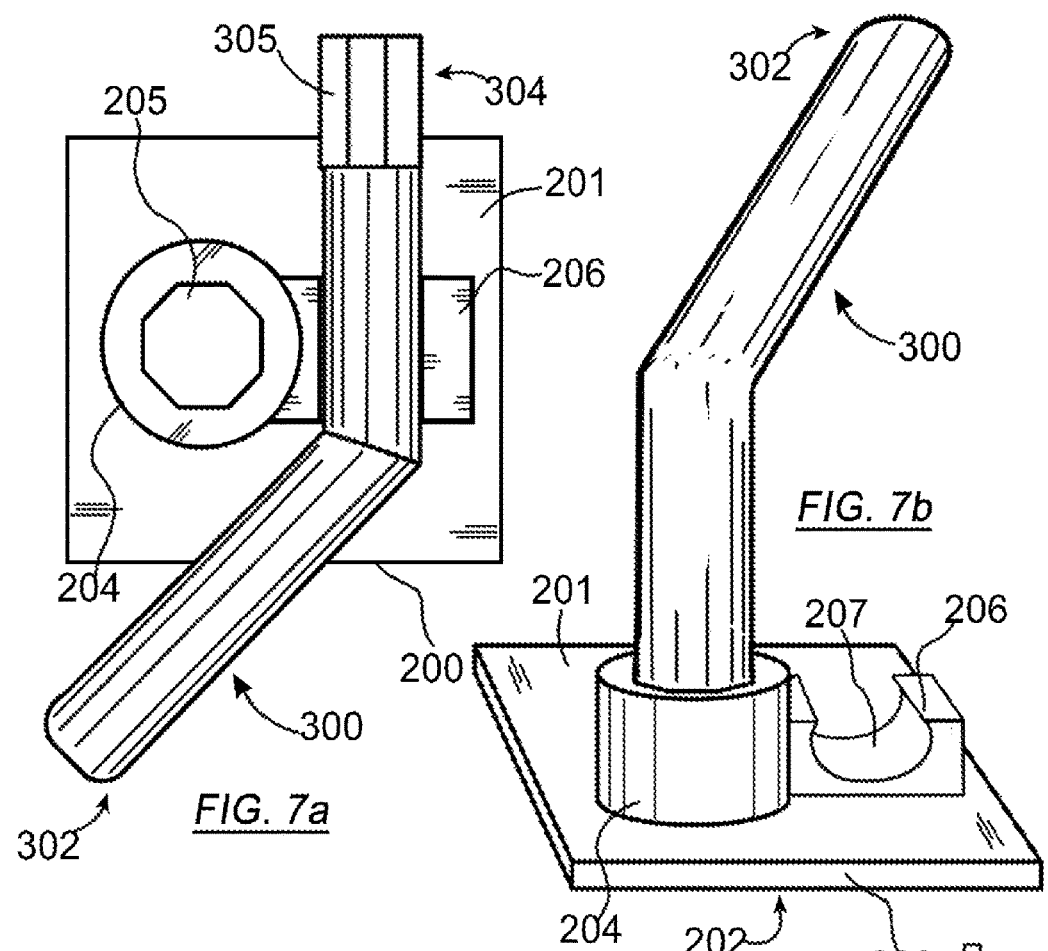
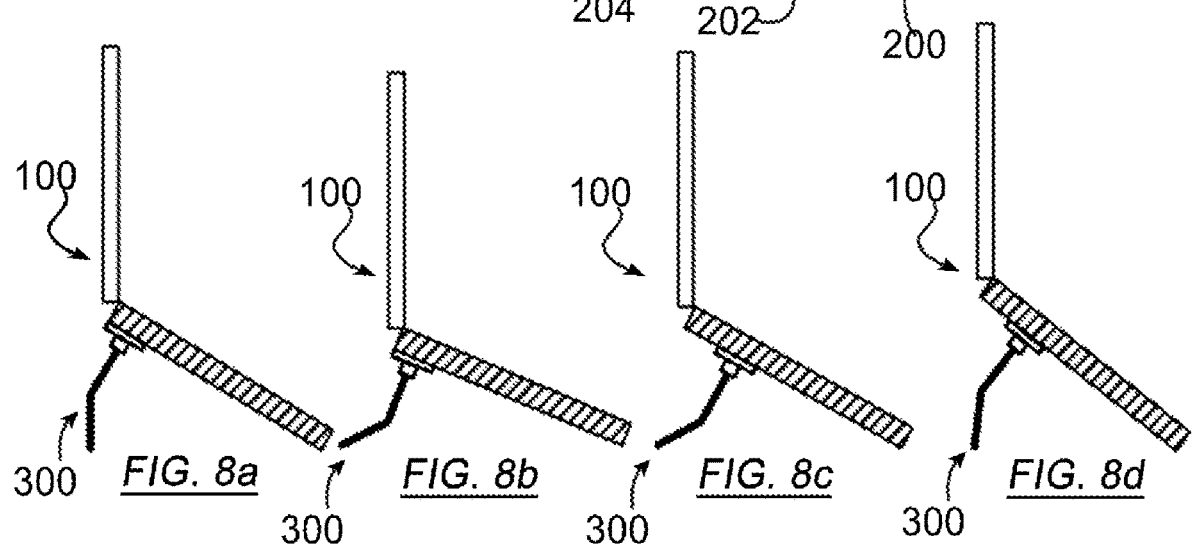

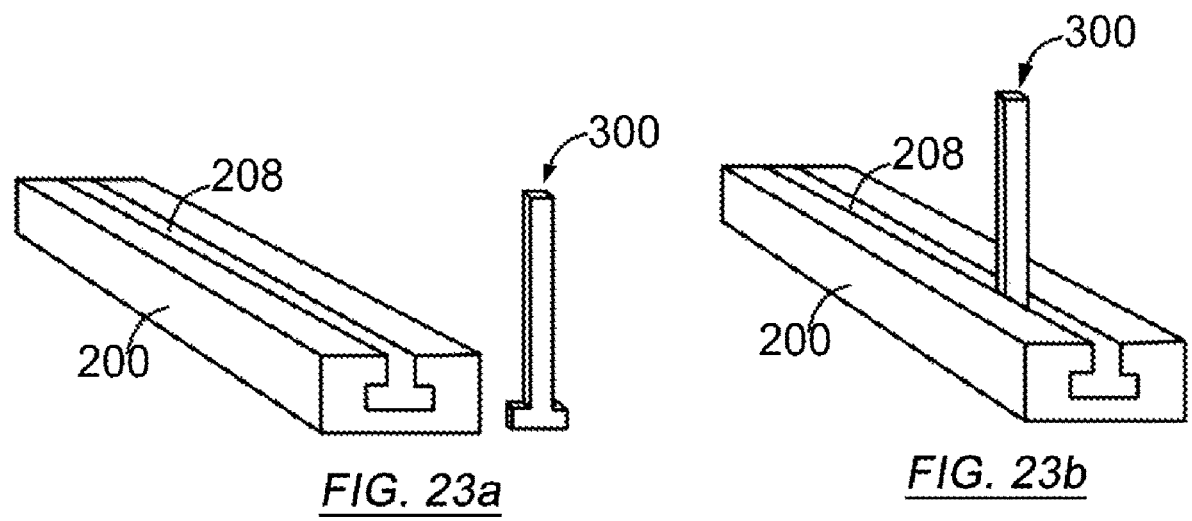
FIG. 23a
FIG. 23b
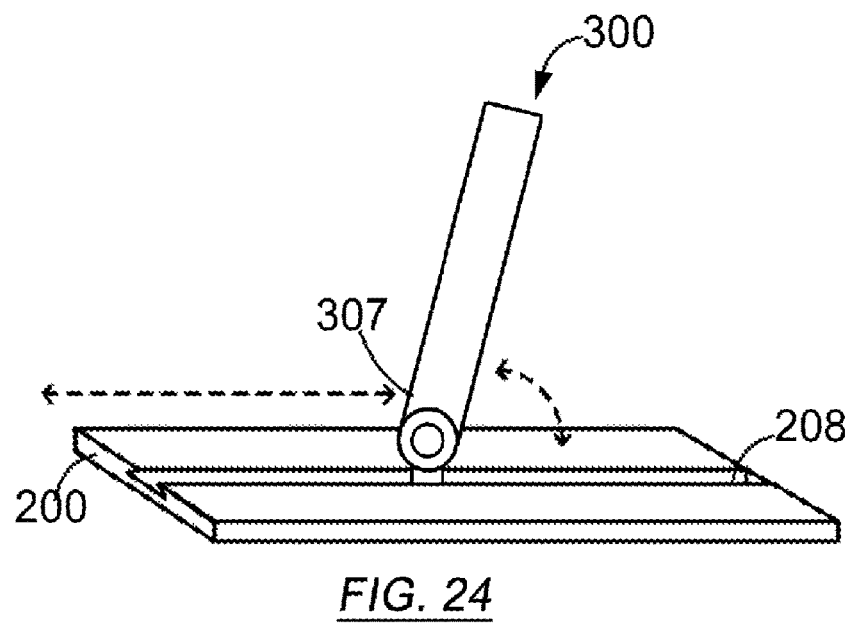
FIG. 24

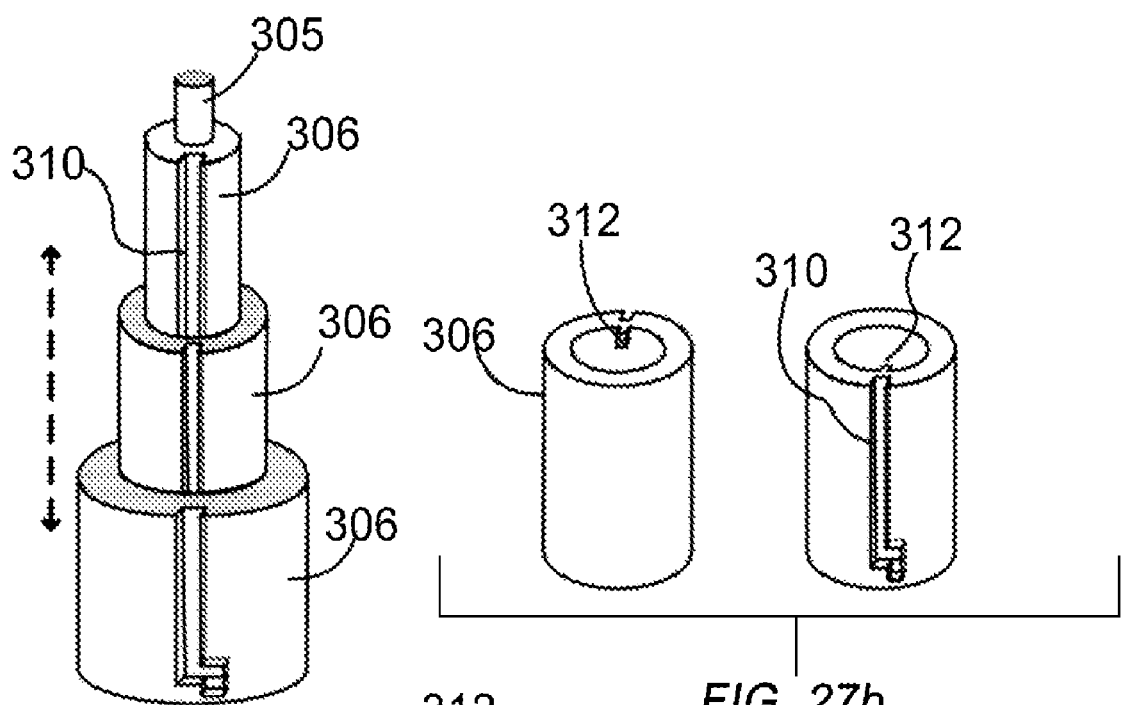
*FIG. 27a*
*FIG. 27b*
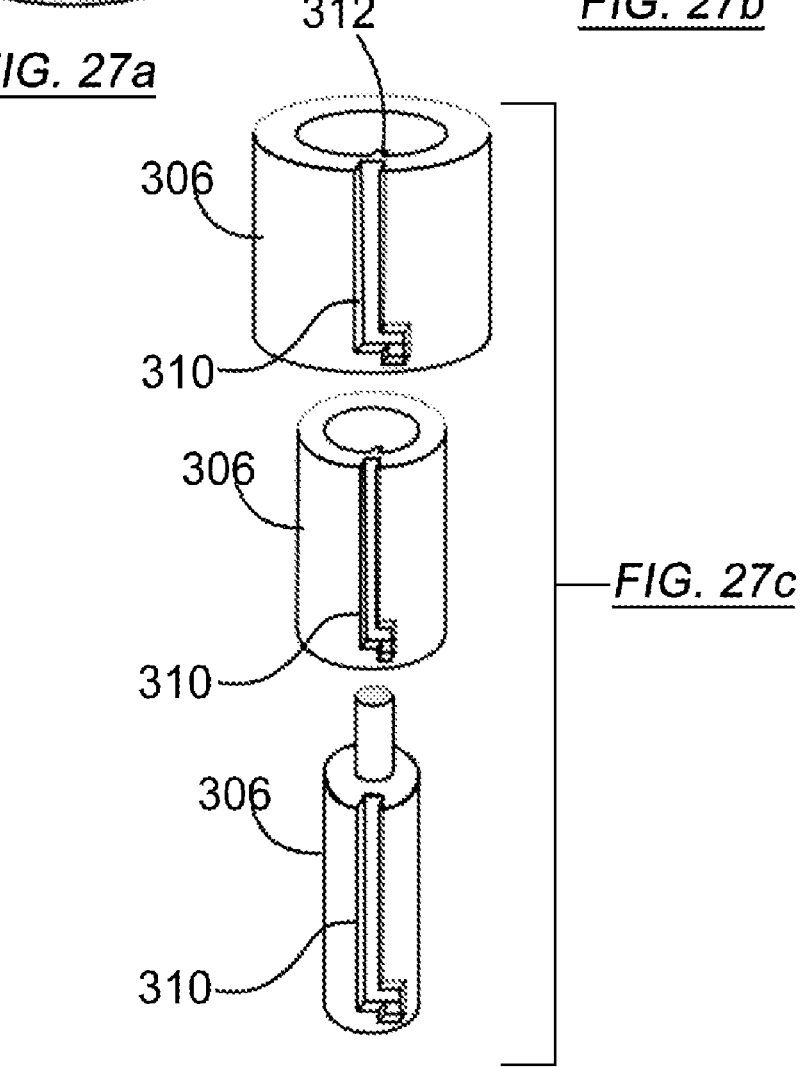
*FIG. 27c*

# COMPUTING DEVICE SUPPORTING STRUCTURE

FIELD

The invention relates generally to supports and stands for computing devices.

BACKGROUND

Various supports for laptop devices and other computing devices are long known in the art. Many past laptop supports include an angularly fixed panel that is configured to support the computing device at a desired angle, either for viewing purposes or, in the case of a laptop, an ergonomic disposition for the keyboard. Some of the forgoing supports are angularly adjustable lap desks, while other supports may have easel-like construction. Generally, such supports are bulky and may not pack in a laptop carrying case. In addition, laptop devices and other computing devices frequently have air intake and air exhaust vents for cooling purposes that may be obscured by past supports.

It would be desirable to provide a support system that includes components that may attach to an underside of a laptop and wherein portions of the support system are easily stowed in a low-profile state when not in use.

It would be desirable to provide a support system for the laptop or other computing device that allows a user to customize the placement of various components of the support system to optimize the cooling functions of the laptop.

Further, it would be desirable for such a support system to include one or more components that are temporarily attachable to an underside of the laptop.

Further, it would be desirable for such a support system to include one or more prong components that are positionable to alter the angular disposition of the underside of the laptop with respect to a support surface such as a desk or table top.

SUMMARY

In a general implementation according to the present invention, a computing device support system includes one or more attachable mounts that may be positioned anywhere on the underside of a computing device which may be a laptop computing device. The system also includes one or more prongs that are configured to serve as height adjustable legs and when coupled to an attachable mount, project from the underside of the device. The one or more attachable mounts may include an adhesive layer that permits each attachable mount to adhere to the underside of the laptop at any desired location and safely away from air vents that may be on the underside of the laptop. Once the attachable mount is affixed to the underside of a computing device, the support system allows varying heights and angles of support by altering the ways in which the one or more prongs and the attachable mount are coupled.

In an aspect combinable with the foregoing exemplary implementation, the attachable mounts include an active prong retention portion that connects to a proximal portion of a support prong.

In an aspect combinable with the foregoing exemplary implementation, the attachable mounts include a passive prong retention portion that connects to the proximal portion of the support prong, a distal portion of the support prong or an intermediate portion of the support prong between the proximal portion and distal portion.

In an aspect combinable with the foregoing exemplary implementation, the active prong retention portion is adapted to hold the support prong in a projecting disposition relative to the underside of the computing device.

In an aspect combinable with the foregoing exemplary implementation, a passive prong retention portion of the attachable mount is adapted to hold the support prong in a non-projecting "stowed" position relative to the underside of the computing device.

In an aspect combinable with the foregoing exemplary implementation, the support prong may be one piece construction.

In an aspect combinable with the foregoing exemplary implementation, the support prong may be multi-piece construction.

In an aspect combinable with the foregoing exemplary implementation, the proximal portion and most distal portion of the support prong may be coaxial.

In an aspect combinable with the foregoing exemplary implementation, a proximal portion and most distal portion of the support prong may be non-coaxial.

In an aspect combinable with the foregoing exemplary implementation, adjacent intermediate portions of the support prong may snap together or otherwise provide for temporary attachment whereby the support prong may be lengthened or shortened.

In an aspect combinable with the foregoing exemplary implementation, a distal end of the support prong may include a stabilizing elements such as a broad foot, a branch or a fork.

In an aspect combinable with the foregoing exemplary implementation, the attachable mount may include a pivotable connector for a proximal support prong.

In an aspect combinable with the foregoing exemplary implementation, the attachable mount may include a connector for a pivoting connector of a support prong.

In an aspect combinable with the foregoing exemplary implementation, the attachable mount may include a slot for a prong-to-mount connector.

In an aspect combinable with the foregoing exemplary implementation, the attachable mount may include a connector for one or more telescoping prong sections.

In an aspect combinable with the foregoing exemplary implementation, one or more support prong sections may include a pivoting connector for connecting adjacent prong sections.

Support Setup

Setup Procedure

The following steps of a setup procedure are generally applicable to various implementations described herein: (1) providing at least one attachable mount, and at least one support prong; (2) adhere at least one of the attachable mounts to the underside of a laptop; (3) to support the laptop in a tilted raised position, couple at least one support prong to an active coupler portion of the attachable mount such that the support prong is in an active, extended position; (4) to adjust the tilt of the laptop, decouple the support prong, rotate the prong-to-mount portion and re-couple the support prong to the attachable mount; (5) to lower the laptop, decouple the support prong and mate support prong with the passive coupler portion of the attachable mount such that the support prong is in a stowed position. Note that in some cases, such as the implementation shown in FIGS. 14a-17b, the step of decoupling the support prong in order to index the support prong may not be required.

Scaling of the attached drawings is approximate. For example, it is intended that the prong-to-mount portion 305 of a support prong 300 be sized and shaped to mate relatively tightly with the active coupler recess 205 and passive coupler recess 207 of the attachable mount 200.

BRIEF DESCRIPTION OF THE DRAWINGS

FIG. 3 is a third exemplary implementation of an apparatus for the support of a laptop device or other computing device;

FIG. 4 is a fourth exemplary implementation of an apparatus for the support of a laptop device or other computing device;

FIG. 5a is a top view of an attachable mount according to various exemplary implementations of the disclosure;

FIG. 5b is an isometric view of the attachable mount of (FIG. 5a);

FIG. 6a is a side elevation of a support prong according to various exemplary implementations of the disclosure;

FIG. 6b is a perspective view of a support prong according to various exemplary implementations of the disclosure;

FIG. 7a is a top view of an attachable mount according to various exemplary implementations of the disclosure, showing a support prong in a stowed position;

FIG. 7b is an isometric view of an attachable mount according to various exemplary implementations of the disclosure, showing an active (extended) position for a support prong;

FIGS. 8a, 8b, 8c and 8d are side elevations showing various height and angular positions obtained by various positions of a support prong;

FIGS. 23a and 23b are isometric views of an attachable mount that includes a slot configured for the insertion of a support prong whereby the support prong may be moved linearly within the slot;

FIG. 24 is an isometric view of an attachable mount that includes a slot configured for the insertion of a pivotable support prong;

FIGS. 27a, 27b and 27c illustrate a means to securely retain a telescoped support prong such as that depicted in (FIGS. 21a, 21b and 21c) in an extended position.

Figure 1:
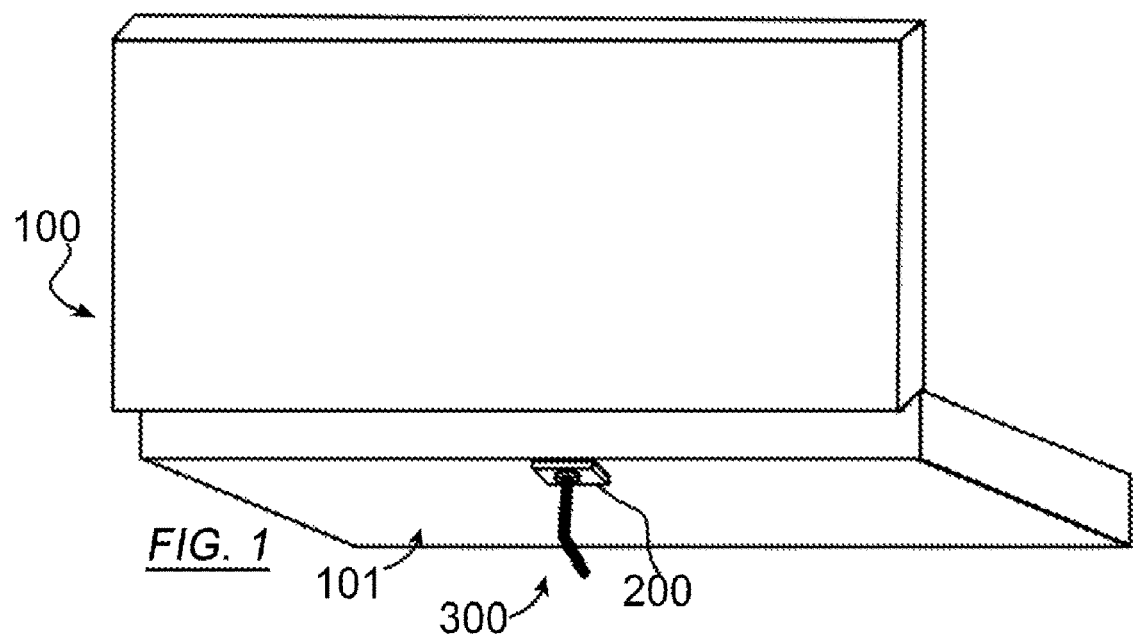
FIG. 1 is an exemplary implementation of an apparatus for the support of a laptop device or other computing device wherein the apparatus is configured to raise the underside of the laptop away from a supporting surface such as a desk top or table top, according to the present invention.
Figure 2:
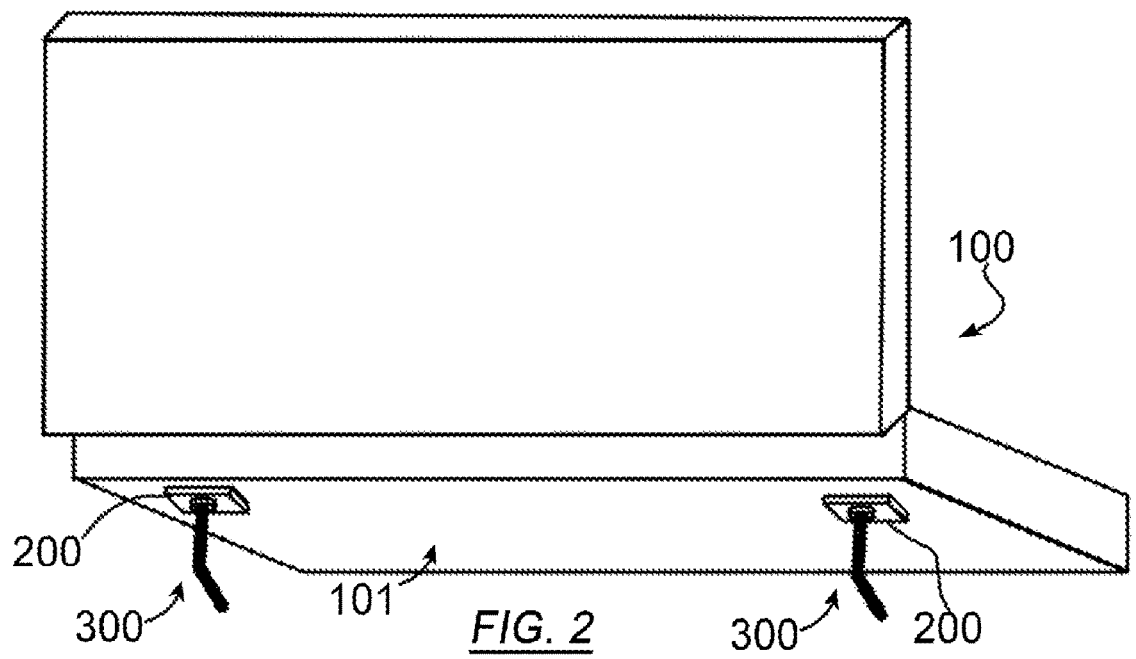
FIG. 2 is a second exemplary implementation of an apparatus for the support of a laptop device or other computing device.
Figure 9A:
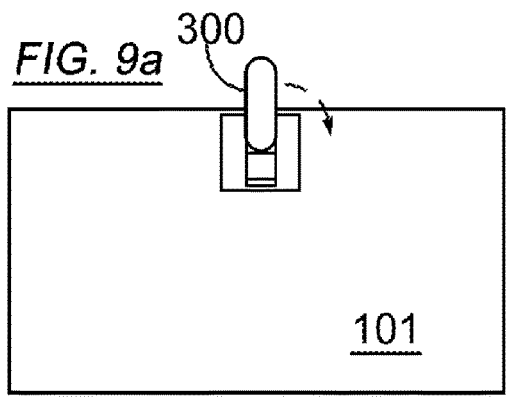
FIGS. 9a, 9b, 9c, 9d, 9e, 9f, 9g and 9h are bottom views of a computing device installed with an exemplary implementation of the support system, and showing various positions of the support prong shown in (FIG. 7b)
Figure 9B:
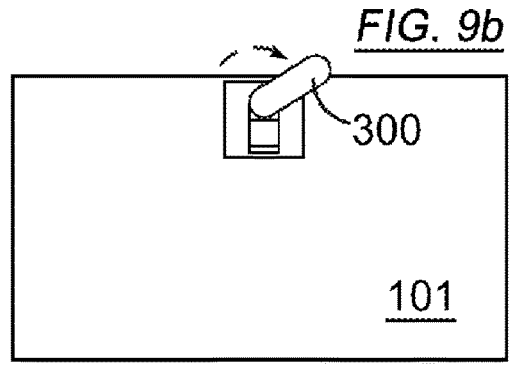
Figure 9C:
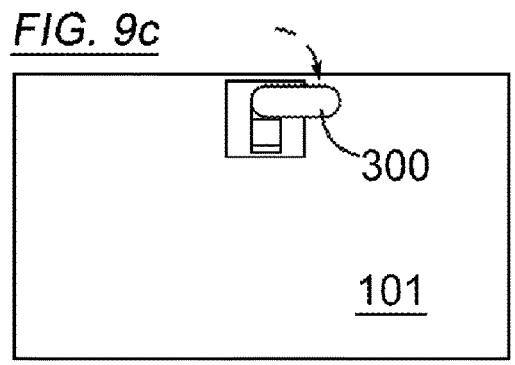
Figure 9D:
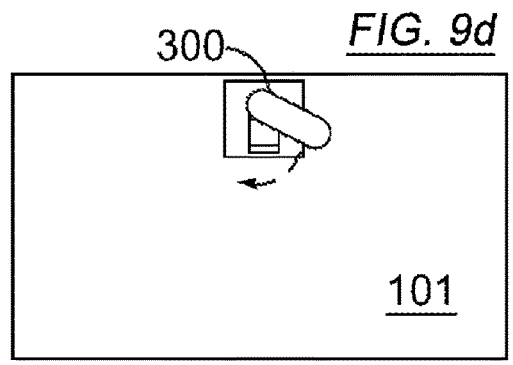
Figure 9E:
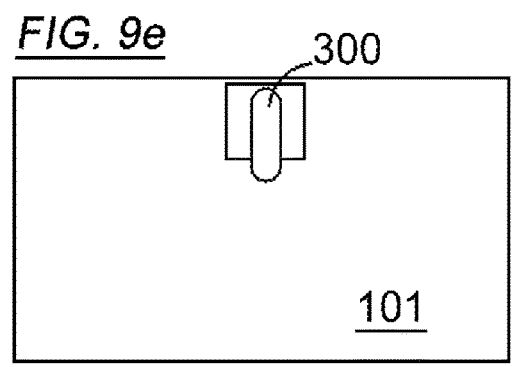
Figure 9F:
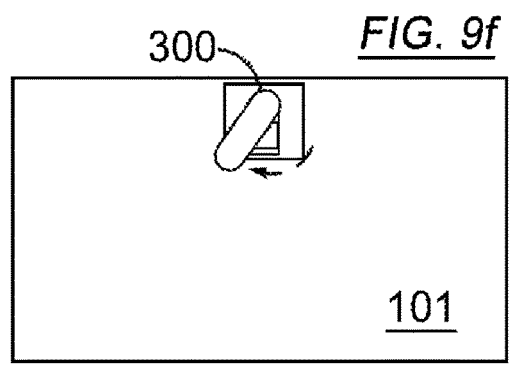
Figure 9G:
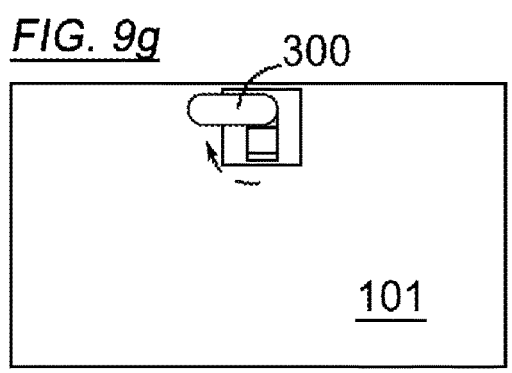
Figure 9H:
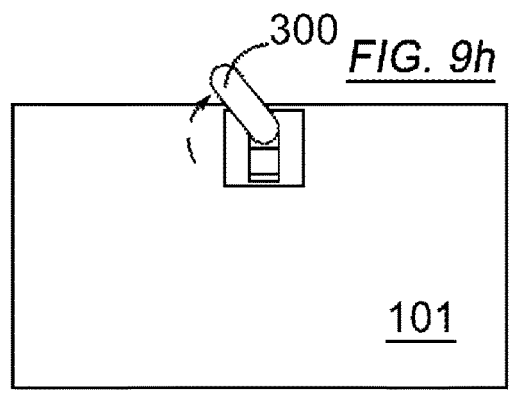
Figure 10A:
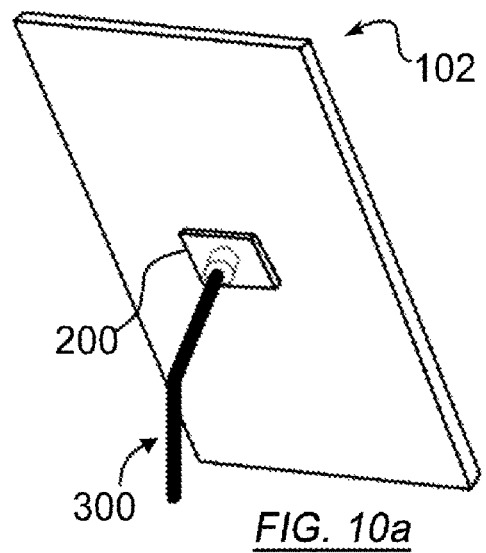
FIGS. 10a and 10b are isometric views showing at least two screen viewing angles obtainable with one exemplary implementation.
Figure 10B:
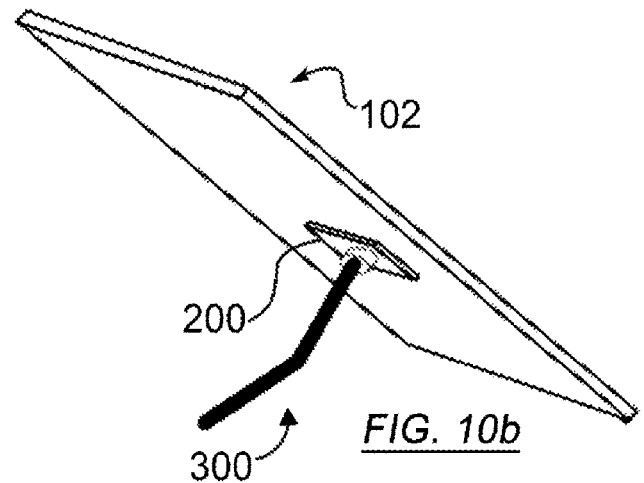

REFERENCE ELEMENT LISTING 100 laptop
101 laptop underside
102 tablet computing device
200 attachable mount
201 attachable mount face
202 adhering surface
204 active coupler portion
205 active coupler recess
206 passive coupler portion
207 passive coupler recess/member
208 attachable mount slot
209 support prong pivot
300 support prong
301 telescoping prong
302 support prong distal end
304 support prong proximal end
305 prong-to-mount connector
306 intermediate support prong section
307 pivotable active coupler portion
310 key way
312 detent Definitions In the following description, the term "support prong" means a relatively slender projecting portion capable of supporting at least a portion of the weight of a laptop. The term "active position" means the support prong is in an extended position and actively supportive of the laptop or tablet being supported. The term "passive position" means that the support prong is stowed in some manner described in the disclosed embodiments. Unless otherwise explained, any technical terms used herein have the same meaning as commonly understood by one of ordinary skill in the art to which this disclosure belongs. The singular terms "a", "an", and "the" include plural referents unless the context clearly indicates otherwise. Similarly, the word "or" is intended to include "and" unless the context clearly indicates otherwise. Although methods and materials similar or equivalent to those described herein can be used in the practice or testing of this disclosure, suitable methods and materials are described below. The term "comprises" means "includes." All publications, patent applications, patents, and other references listed in this disclosure are incorporated by reference in their entirety for all purposes. In case of conflict, the present specification, including explanations of terms, will control. In addition, the materials, methods, and examples are illustrative only and not intended to be limiting.

DETAILED DESCRIPTION OF THE EMBODIMENTS

Referring generally to FIGS. 1-28, a support system for a laptop 100 or other computing device includes one or more attachable mounts 200 that are adapted to attach to a computing device 100; normally the underside 101 of the device, and, one or more support prongs 300 that couple to, or otherwise attach to an attachable mount. The support prongs 300 have a support prong proximal end 304 which may be pivotable or non-pivotable nearest the attachable mount 200 when the support prong 300 is attached thereon, and a distal end 302 configured to contact a support surface such as a desk top or table top. The proximal end and distal ends of the support prong may be coaxial or non-coaxial.

Figure 11:
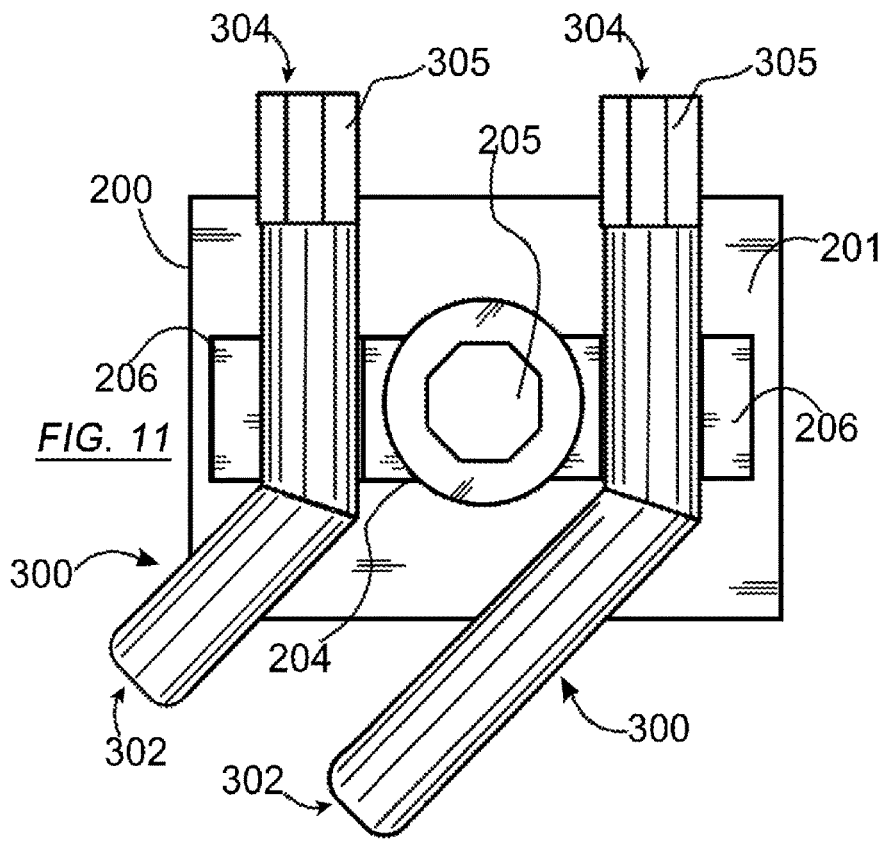
FIG. 11 is a top view of an attachable mount including two passive prong retention portions and shows two support prongs in a stowed position.
Figure 12:
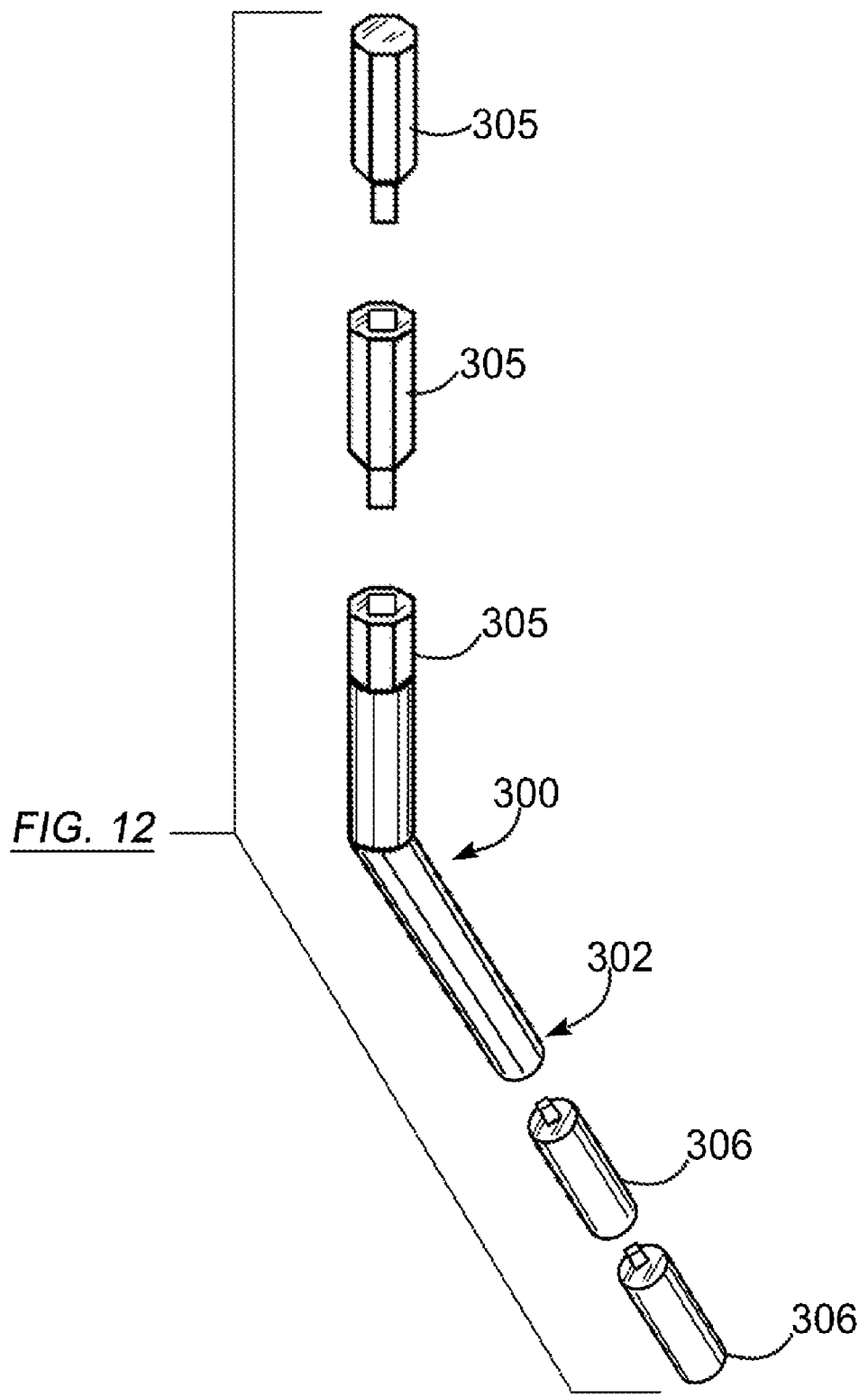
FIG. 12 is an isometric view of a multi-piece support prong.
Figure 13:
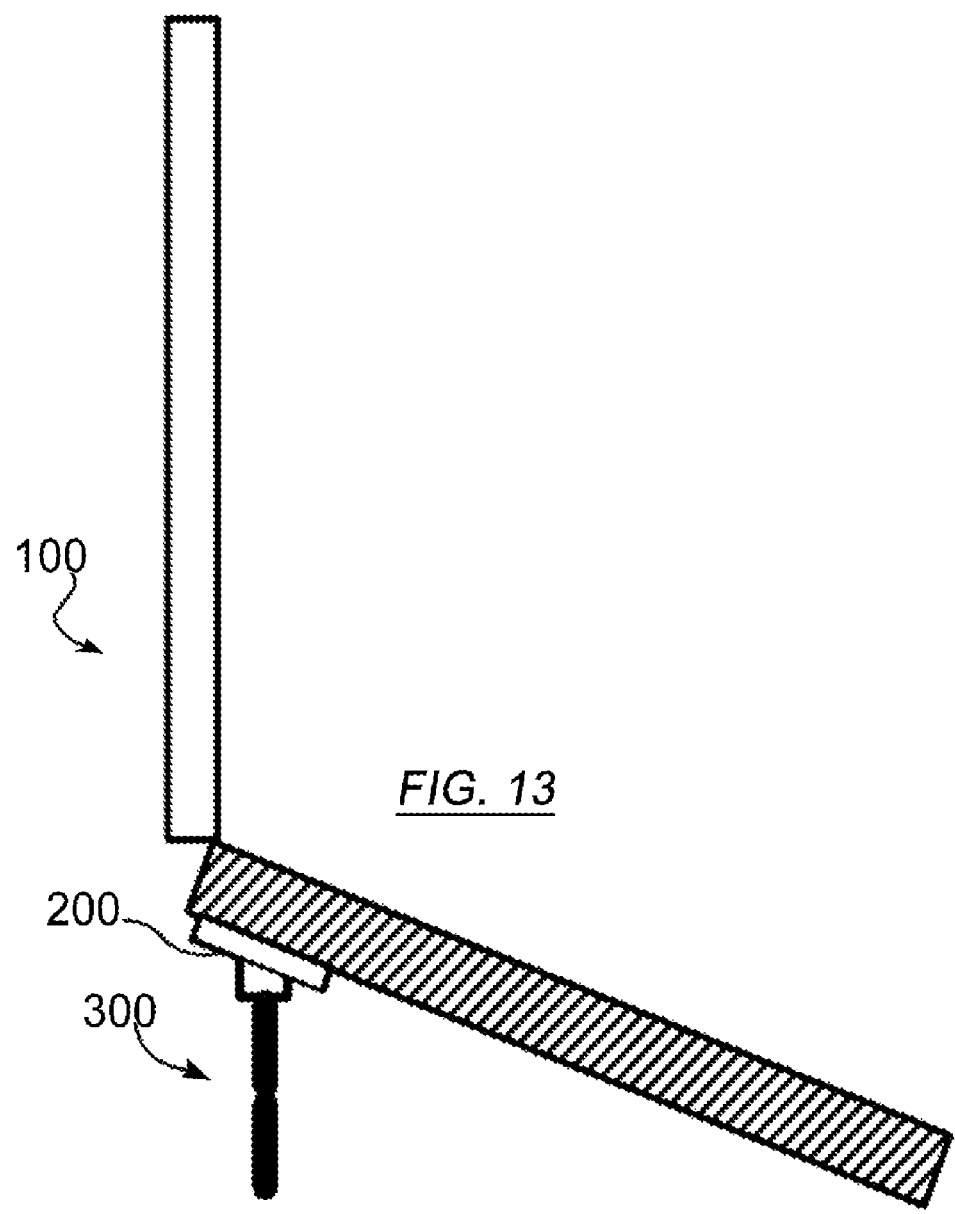
FIG. 13 is a side elevation of an exemplary implementation according to the present invention.

In the case of one non-coaxial implementation shown in FIGS. 1-12, the support prong 300 includes a prong-to-mount connector 305 with a male octagonal end which is insertable into a matching recess 205 of an active coupler portion 204, such that by indexing sides of the octagonal end, various adjustments of height and angle for the supported computing device are obtained. Although the male octagonal end connection to the octagonal recess resists inadvertent slippage and assists in maintaining a fixed position for the prong, other mating configurations such as that depicted in FIGS. 14a and 14b that show a cylindrical recess are suitable. In the case of a cylindrical recess the support prong 300 may be secured by a friction fit and various height adjustments and angular adjustments may be obtainable without requiring removal of the prong, by twisting or rotation of the prong-to-mount portion 305 within the recess 205. Side elevation FIGS. 8a-8d best illustrate only some of the height and angular adjustments obtained by indexing the support prong. In various non-coaxial implementations depicted, while the inside angle is generally 140°, other angles are conceivable. In the particular implementations depicted, while the non-coaxial implementation includes generally fixed inside and outside angles, it is possible that the proximal and distal portions of the support prong are movable in relation to one another. Various non-coaxial implementations may include one piece construction (FIGS. 1-11), or may include multi-part construction (FIG. 12). A non-limiting list of suitable materials for the non-coaxial implementations of both the attachable mount 200 and support prongs 300 may be rigid plastics, metals, wood, bendable plastics, rubber, rubber over wire armature, and rubber over plastic armature.

Various implementations that include a support prong 300 with coaxial sections are shown generally in FIGS. 13-17b. Moving to FIGS. 14a and 14b, an attachable mount 200 includes an active coupler portion 204 with a recess 205 set at an angle relative to a face 201 of the attachable mount 200. One or more intermediate support prong sections 306 may be assembled and a prong-to-mount connector 305 inserted into the active coupler portion recess 205 to obtain various height and angle settings. When packing the computing device, the support prong 300 may be stowed in the position shown in FIG. 16a with the support prong retained by the passive coupler portion 206. It should be noted that while in the foregoing examples, recess 205 is shown set at an angle relative to face 201, prong-to-mount connector 305 may be set an angle relative to the remainder of the prong; that is, element 305 may be coaxial or non-coaxial with respect to the remainder of the prong 300.

Figure 18:
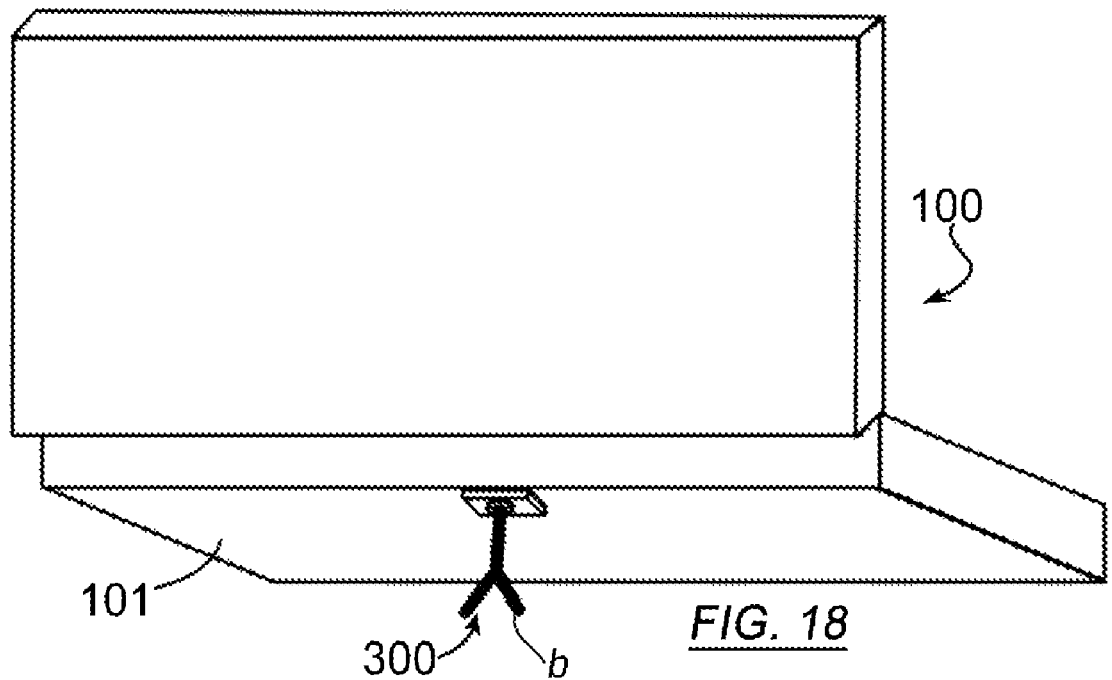
FIG. 18 is an isometric view of another exemplary implementation according to the present invention.
Figure 19:
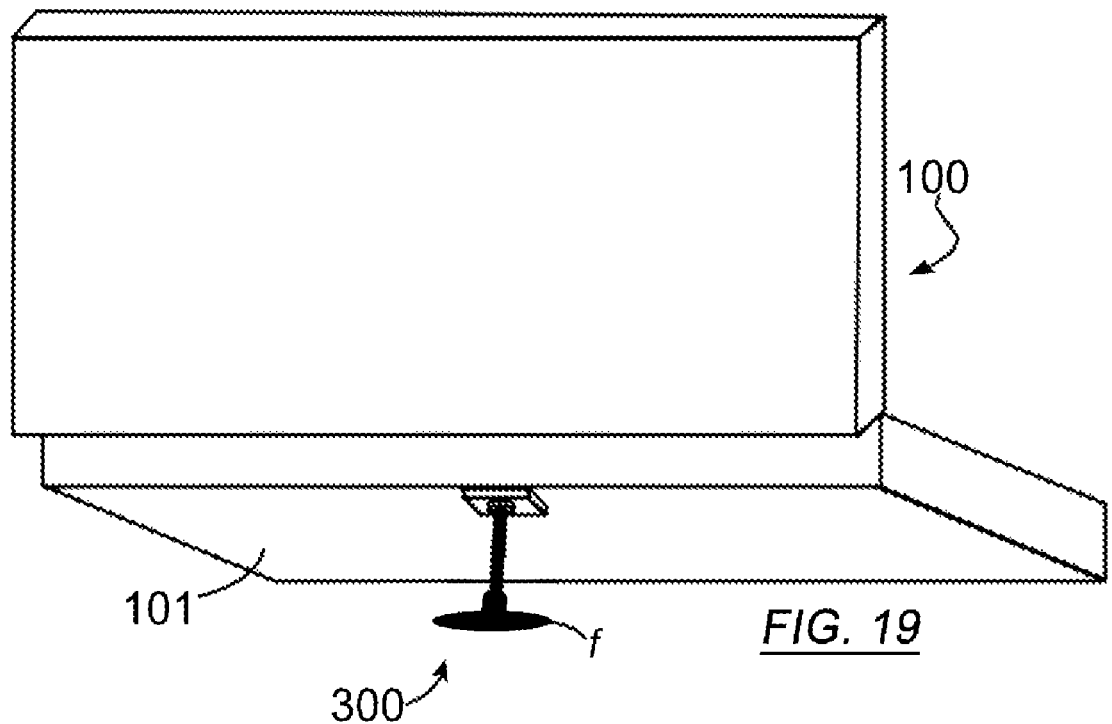
FIG. 19 is an isometric view of yet another exemplary implementation according to the present invention.

Various implementations including a branching support prong (b) and a prong with a wide foot at its distal end are depicted in FIGS. 18 and 19 respectively. The foot (f) shown in FIG. 19 may pivot and may possess a ball joint permitting it a wide range of movement. Typically in all implementations depicted, it is intended that the distal end 302 of any support prong 300 include a non-slip element such as an elastomeric layer or an elastomeric texture to prevent the prong from sliding against a table top or the like.

Figures 16A, 16B:
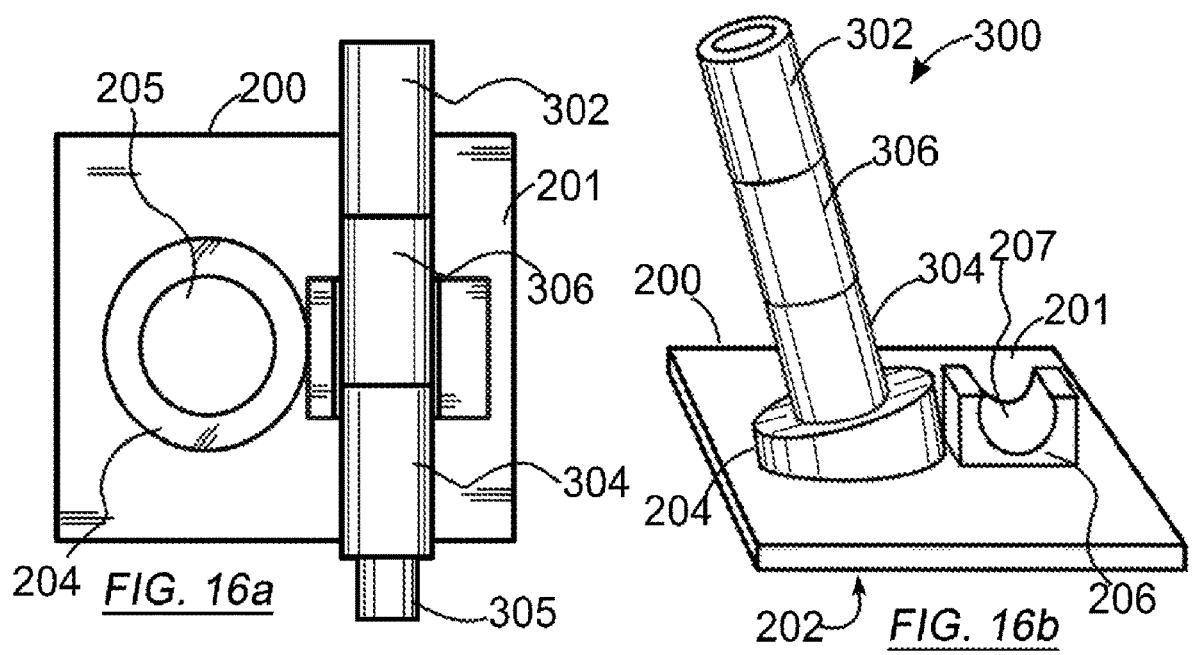
FIG. 16a is a top view showing the support prong of (FIG. 15) retained by an attachable mount in a stowed position.
FIG. 16b is an isometric view showing the support prong of (FIG. 15) retained by an attachable mount in an active position.
Figures 17A, 17B:
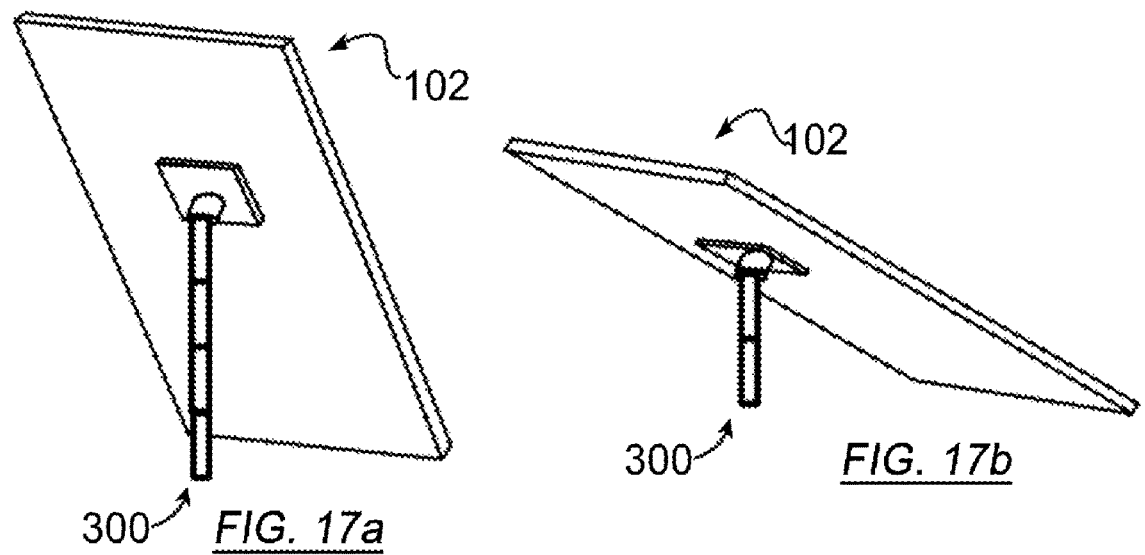
FIGS. 17a and 17b are isometric views showing at least two computing device positions obtainable with one exemplary implementation.
Figure 25A:
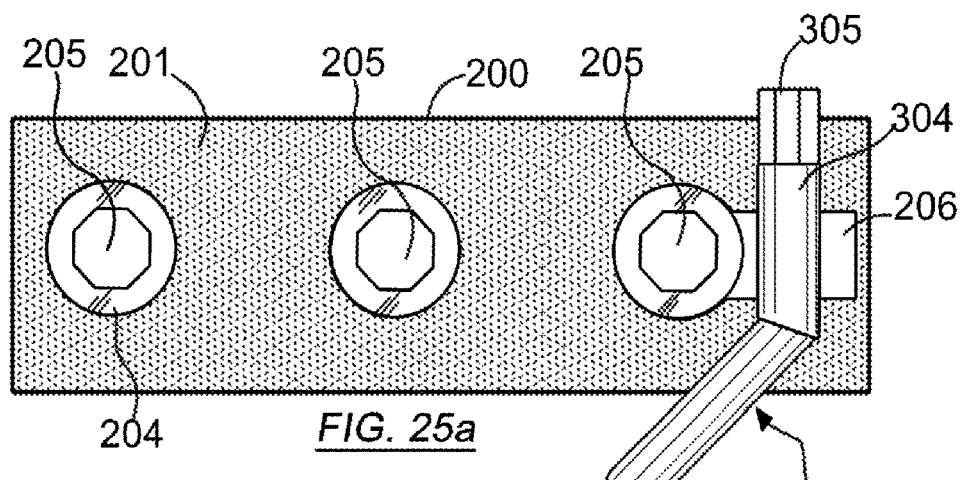
FIGS. 25a and 25b illustrate respectively a top view and an isometric view of an attachable mount configured for multiple support prongs.
Figure 25B:
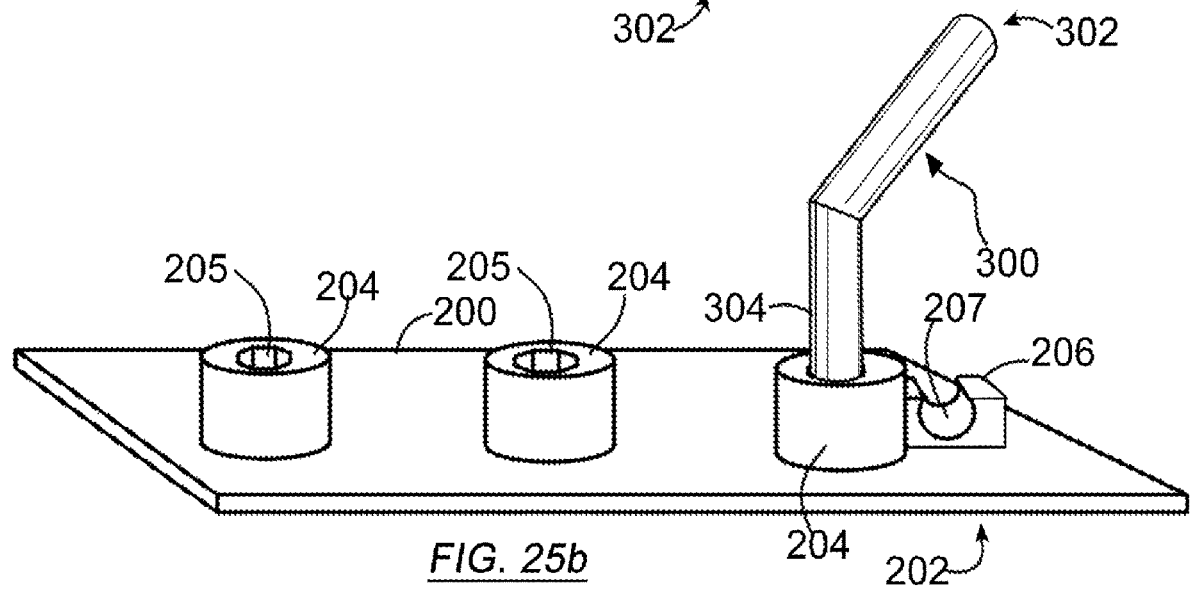

Various implementations including attachable mounts 200 adapted to secure plural support prongs 300 are shown in FIG. 11 and FIGS. 25a and 25b. Specifically, in the implementation shown in FIG. 11, two support prongs are provided, a longer prong and a relatively shorter prong. In the implementation shown in FIGS. 25a and 25b, the attachable mount 200 may be mounted to an underside of a laptop either along the x or y axis relative to the laptop underside, and one or more equal length or non-equal length support prongs 300 comprised of one or more intermediate sections 306 as shown in FIGS. 16a, 16b and elsewhere in this disclosure, may be inserted into the active coupler portions 204 shown. Using combinations of one or more prongs with one or more coupler portions 204, various desired support angles and heights may be obtained.

Figure 20A:
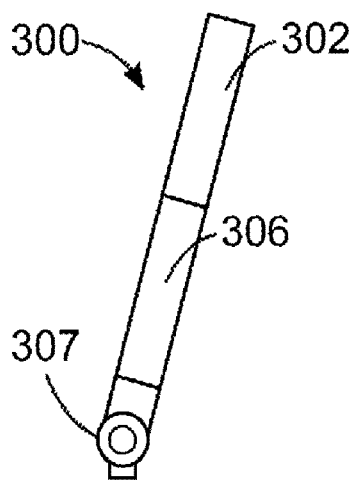
FIGS. 20a and 20b show a pivoting prong connector configured to attach to an attachable mount.
Figure 20B:
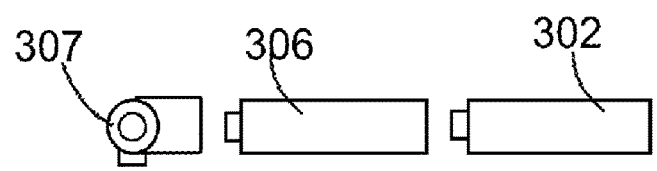
Figure 21A:
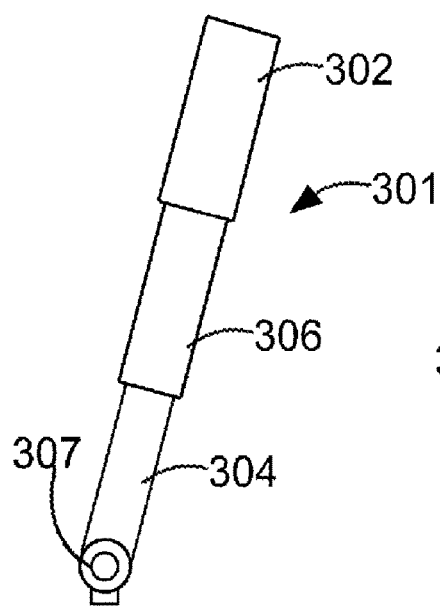
FIGS. 21a, 21b and 21c show the pivoting prong connector as shown in (FIGS. 20a and 20b), and a telescoping support prong.
Figure 21B:
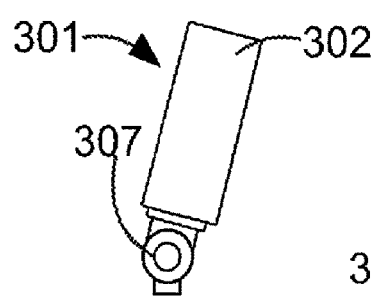
Figure 21C:
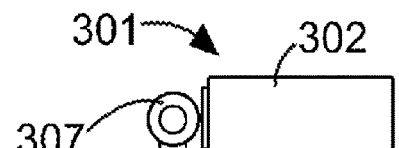
Figure 22A:
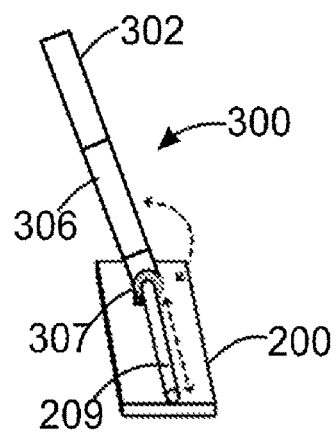
FIGS. 22a, 22b and 22c show a pivotable support prong that is connected to a prong connector; in this case a post or rail of an attachable mount, wherein the pivotable support prong is slidable along the prong connector.
Figure 22B:
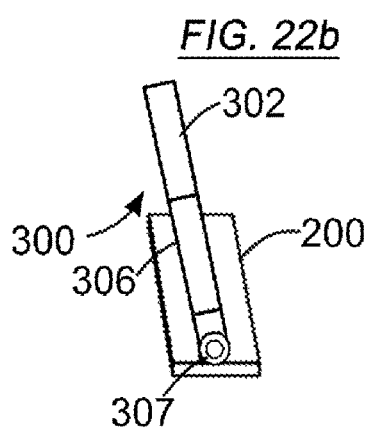
Figure 22C:
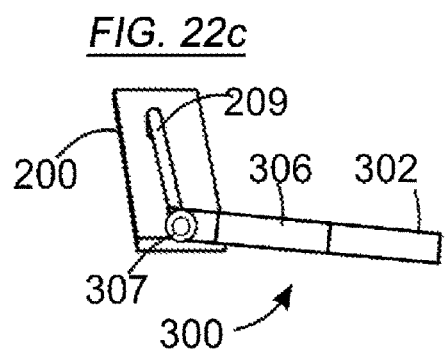
Figure 22D:
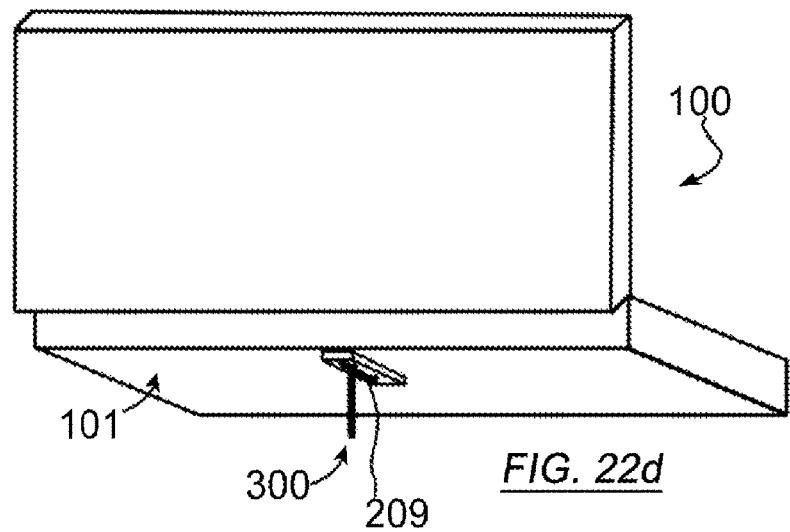
FIG. 22d is an isometric view of yet another exemplary implementation according to the present invention.

Various implementations including a multi-section 306 support prong 301 capable of telescoping are shown in FIGS. 21a-21c. Telescoping implementations of the telescoping support prong 301 may be combined with a pivotable active coupler portion 307 that may be mated with an attachable mount 200 as shown other figures of this disclosure. FIGS. 20a and 20b show a coaxial non-telescoping multi-section support prong 300 with a distal end 302 and which may include one or more intermediate sections 306. The pivotable active coupler portion 307 may employ a friction pivot or radial notches (not shown) that enable a support prong position to be suitably maintained. Persons having knowledge in the art will appreciate that the range of rotation about the pivot point may be constrained by the laptop body, or by detents, stops or other features located at the pivot. With regard to telescoping implementations, each section of the telescoping support prong 301 may include an somewhat tapered interior profile so that adjacent prong sections are secured by friction fit, or, the sections may include key ways 310 and mating detents 312 as shown in FIGS. 27a-27c so as to secure each prong section relative to adjacent prong sections to prevent the telescoping support prong 301 from collapsing.

An implementation shown in FIGS. 23a-23b shows an attachable mount 200 including an attachable mount slot 208 wherein a support prong 300 may be inserted and slidably positioned. It is possible that the clearances between the support prong and corresponding surfaces of the attachable mount slot 208 are suitably close such that the prong 300 must be tensionably moved through the slot and will retain a desired position. It is possible that the pivotable active coupler portion 307 shown in FIGS. 20*a*-20*b* may be paired with slot 208, and a coaxial, non-coaxial, telescoping or non-telescoping support prong 300, 301 may be added.

An implementation shown in FIGS. 22*a*-22*d* includes a support prong pivot 209 of an attachable mount adapted to secure a support prong (306, 302) in a slidable and pivotable arrangement. The attachable mount may include a support prong with a proximal pivotable active coupler portion 307 that is pivotable as well as slidable.

Figure 26A:
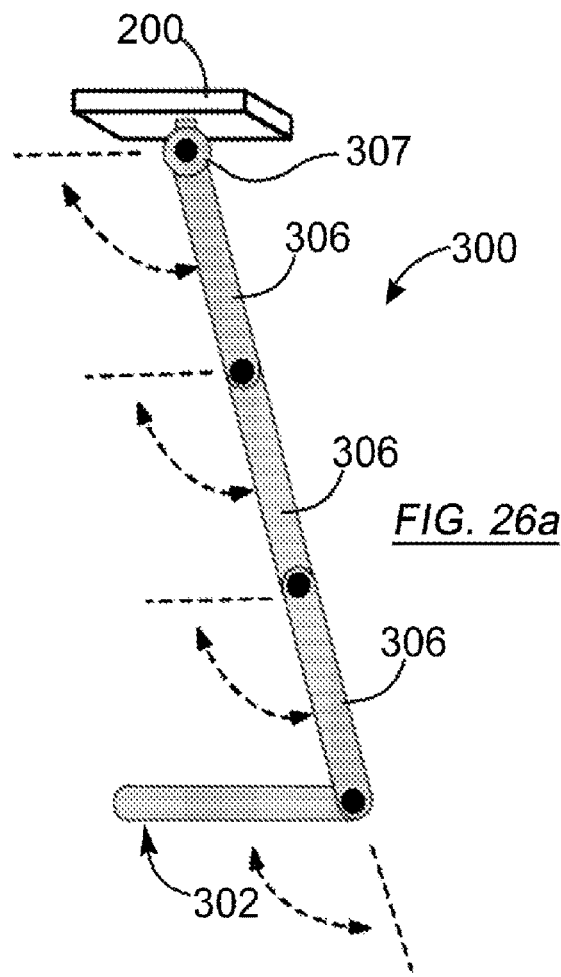
FIGS. 26a, 26b and 26c are isometric views of a multi-piece pivotable support prong in various arrangements according to various implementations of the present invention.
Figure 26B:
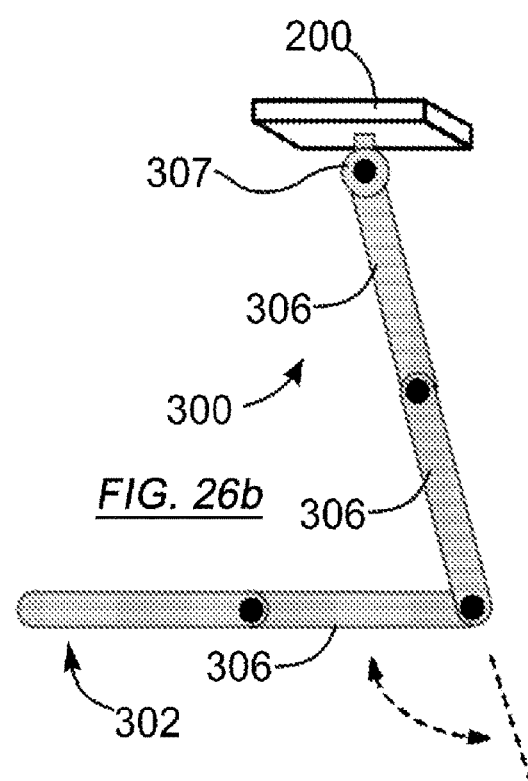
Figure 26C:
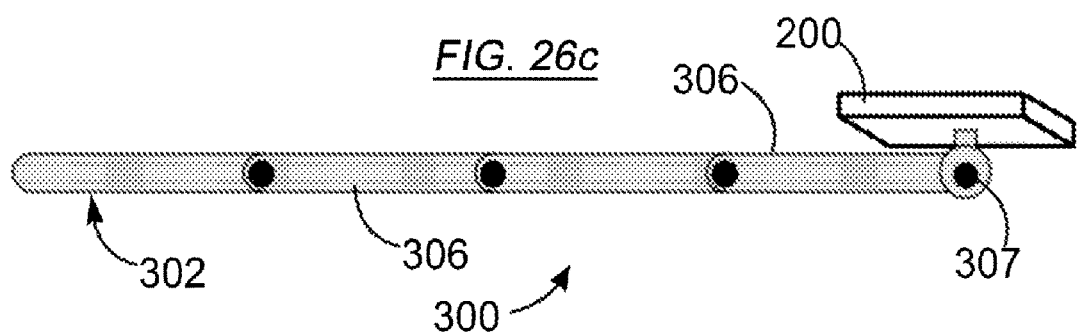
Figure 28:
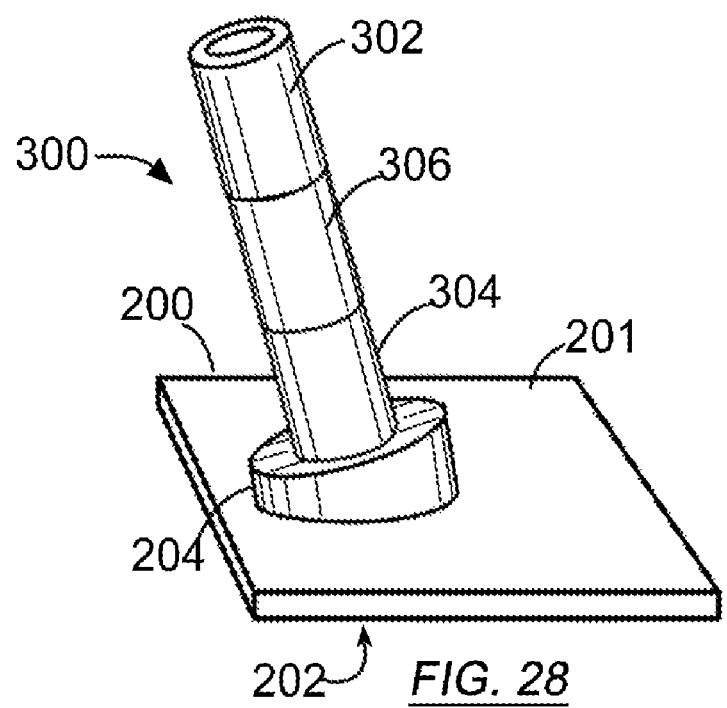
FIG. 28 depicts an isometric view of an exemplary implementation lacking a passive coupler recess.

An implementation shown in FIGS. 26*a*-26*c* includes a multi-part support prong 300 made up of prong sections 306 and an attachable mount 200 with a pivotable active coupler portion 307. Each prong section 306 includes a pivotable connection with an adjacent prong section. One or more of the depicted implementations may be attached to a laptop to provide a height and angle adjustable support. The support prongs may form relatively wide surface contacting sections to provide additional support for a computing device. It is possible that a multi-part support prong may fold against other adjacent sections 306 such that the entire prong assembly may be collapsed against the underside of a computing device. Alternately, FIG. 26*c* shows the prong assembly in an entirely extended arrangement against the underside of a computing device.

Figures 14A, 14B:
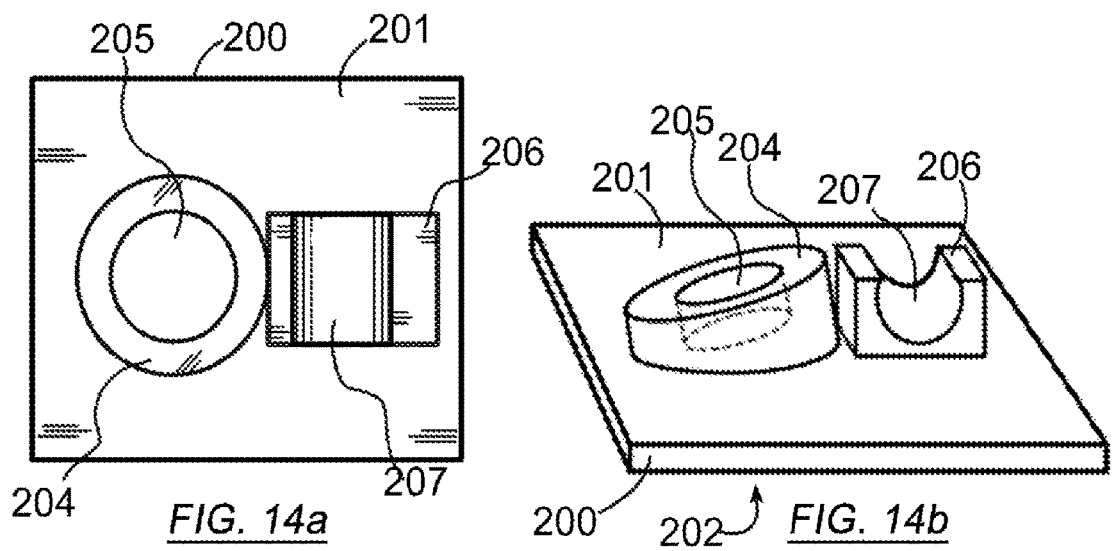
FIG. 14a is a top view of the exemplary implementation shown in (FIG. 13) according to the present invention.
FIG. 14b is an isometric view of the attachable mount shown in (FIG. 14a)
Figure 15:
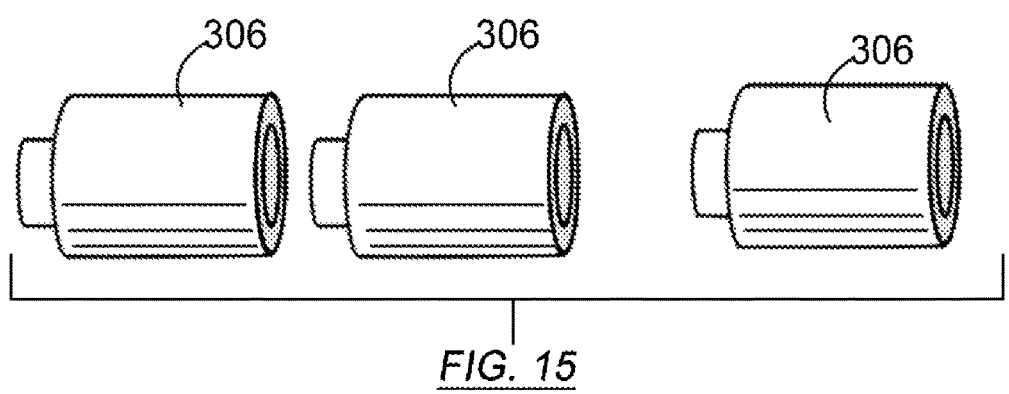
FIG. 15 is an isometric view of intermediate segments of a support prong in an exemplary implementation according to the present invention.

In various implementations depicted herein, typically, the attachment means for attaching the attachable mount to a computing device is an adhesive layer on the underside of the attachable mount, e.g., adhering surface 202 (FIGS. 5*b*, 7*b* and 14*b*). The adhesive layer may be double sided adhesive. Alternatives may include hook and loop fasteners to affix the attachable mount or magnets. The addition or subtraction of one or more intermediate sections 306 may be employed to lengthen or shorten the support prong. Aspects, objects and features of any one implementation described herein may be combined with any other aspect, object or feature of any other implementation described herein. In various implementations, sections 306 of the support prongs may be thicker or thinner than adjacent sections. Sections 306 may be solid or hollow. One or more sections may be weighted. A distal section including a foot (f) portion may be wider than a more proximal section. While the prong-to-mount connector 305 of the support prongs 300 is octagonal or cylindrical and coaxial with the remainder of the support prong in the implementations described herein, the prong-to-mount connector 305 may possess any profile suited to a particular desired prong angle and may be set at an angle with respect to an adjacent and distal section.

It should be understood that the drawings and detailed description herein are to be regarded in an illustrative rather than a restrictive manner, and are not intended to be limiting to the particular forms and examples disclosed. Accordingly, it is intended that this disclosure encompass any further modifications, changes, rearrangements, substitutions, alternatives, design choices, and implementations as would be appreciated by those of ordinary skill in the art having benefit of this disclosure, and falling within the spirit and scope of the following claims.

What is claimed is:

1. A device support system comprising:
    (1) a device;
    (2) a support member including a plurality of prong members adapted to connect together;
    (3) a mounting member attached to an attachment surface of the device, the mounting member including an active coupler member, the active coupler member including an aperture with a longitudinal axis slanted relative to the attachment surface of the device, the aperture adapted to mate to an end of the support member;
    (4) the support member is length adjustable by adding or removing the prong members in a stacked coaxial configuration.

2. The device support system according to claim 1, the mounting member including a passive coupler portion separate from the active coupler member adapted to store the support member in a stowed position when disconnected from the mating portion of the active coupler member.

* * * * *